(12) United States Patent
Trainin (10) Patent No.: US 9,325,456 B2
(45) Date of Patent: Apr. 26, 2016

(54) METHOD AND APPARATUS FOR DELAYED RECOVERY FOR BLOCK ACKNOWLEDGEMENT BURSTING IN A WIRELESS NETWORK

(75) Inventor: Solomon Trainin, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 2184 days.

(21) Appl. No.: 11/085,928

(22) Filed: Mar. 22, 2005

(65) Prior Publication Data

US 2006/0215563 A1   Sep. 28, 2006

(51) Int. Cl.
*H04L 1/16*     (2006.01)
*H04L 1/18*     (2006.01)
*H04L 12/801*   (2013.01)
*H04L 12/807*   (2013.01)
*H04W 28/18*    (2009.01)

(52) U.S. Cl.
CPC ............ *H04L 1/1685* (2013.01); *H04L 1/1621* (2013.01); *H04L 1/187* (2013.01); *H04L 1/1832* (2013.01); *H04L 47/10* (2013.01); *H04L 47/14* (2013.01); *H04L 47/27* (2013.01); *H04W 28/18* (2013.01)

(58) Field of Classification Search
CPC ... H04L 1/1621; H04L 1/1835; H04L 1/1874; H04L 47/27; H04B 7/0417
USPC .......... 370/394, 429, 448, 503, 528; 714/748, 714/749
See application file for complete search history.

(56) References Cited

U.S. PATENT DOCUMENTS

| | | | | |
|---|---|---|---|---|
| 5,130,986 A * | 7/1992 | Doshi et al. | ................... | 370/231 |
| 5,163,046 A * | 11/1992 | Hahne et al. | .................. | 370/237 |
| 6,044,434 A * | 3/2000 | Oliver | ........................ | 711/110 |
| 6,366,687 B1 * | 4/2002 | Aloni | ..................... | G06T 7/001 382/144 |
| 6,829,670 B1 * | 12/2004 | Nakamura | ..................... | 710/310 |
| 7,092,355 B1 * | 8/2006 | Duong-Van | ................... | 370/230 |
| 7,177,277 B2 * | 2/2007 | Koponen et al. | .............. | 370/235 |
| 7,284,179 B2 * | 10/2007 | Jiang | ............................ | 714/748 |
| 2001/0055313 A1 * | 12/2001 | Yin et al. | ....................... | 370/466 |
| 2004/0190540 A1 * | 9/2004 | Miyake et al. | ................ | 370/428 |
| 2004/0215753 A1 * | 10/2004 | Chan et al. | ..................... | 709/223 |
| 2004/0233976 A1 * | 11/2004 | Han | ..................... | H04L 25/061 375/147 |
| 2005/0135396 A1 * | 6/2005 | McDaniel et al. | ............ | 370/412 |
| 2006/0104300 A1 * | 5/2006 | Ho | ................ | 370/428 |
| 2006/0107166 A1 * | 5/2006 | Nanda | ........................... | 714/748 |
| 2006/0120323 A1 * | 6/2006 | Ye et al. | ......................... | 370/329 |
| 2006/0203752 A1 * | 9/2006 | Ginzburg | ....................... | 370/278 |

OTHER PUBLICATIONS

Toniatti, T.; Trombetta, F. "Performance Simulation of End-to-End Windowing in ATM Networks", Infocom '92. Eleventh Annual Joint Conference of the IEEE Computer and Communications Societies, IEEE; pp: 495-502 vol. 2; May 1992.*
Provisional U.S. Appl. No. 60/616,335 Specification and Claims Oct. 5, 2004.*

* cited by examiner

*Primary Examiner* — Xavier S. Wong
(74) *Attorney, Agent, or Firm* — Thorpe North & Western LLP (57) ABSTRACT

A minimum block acknowledgement (BA) window size is calculated for use during a BA transaction based on the processing delay of an originator device. The actual BA window size that is used during the BA transaction is not allowed to fall below the minimum value. The actual BA window size is determined as a function of the receive buffer size of a recipient device involved in the BA transaction.

29 Claims, 4 Drawing Sheets

METHOD AND APPARATUS FOR DELAYED RECOVERY FOR BLOCK ACKNOWLEDGEMENT BURSTING IN A WIRELESS NETWORK

TECHNICAL FIELD

The invention relates generally to wireless communication and, more particularly, to wireless networking.

BACKGROUND OF THE INVENTION

In next generation wireless networks, a block acknowledgement (BA) mechanism may be employed in which a single acknowledgement frame is used to acknowledge the successful receipt of a number of data frames. During a BA transaction, a first network device (called the originator) may transmit a series of data frames to a second network device (called the recipient). After the frames have been transmitted, the originator may transmit a BA request to the recipient requesting that the recipient acknowledge receipt of the transmitted data frames. The recipient may then respond by transmitting a BA response to the originator that indicates which of the originally transmitted data frames were successfully received and which were not. If one or more of the transmitted data frames were not successfully received, the originator may retransmit the frames in a future frame sequence. After the originator receives the BA response from the recipient, there may be a processing delay before the originator is able to determine from the BA response which data frames, if any, need to be retransmitted. This delay is due primarily to interrupt latency.

When the recipient receives data frames from the originator, it may temporarily store the frames within a receive buffer according to the sequence numbers associated with the frames. The data frames may then be read in sequence from the receive buffer. After a data frame has been read from the receive buffer, a memory location in the buffer is freed. If a data frame was unsuccessfully received by the recipient, the corresponding data frame cannot be read out from the receive buffer until it has been retransmitted and successfully received. Thus, if one or more unsuccessfully received data frames resides at the beginning of the receive buffer, memory locations within the buffer will not be freed and the buffer may become full. If the receive buffer becomes full, the originator will no longer be able to transfer data frames to the recipient. If the originator is unable to continue the BA burst after a predetermined period of time (e.g., a short interframe space (SIFS)), the burst is considered "broken." A broken BA burst will typically result in reduced throughput and link utilization. There is a need for techniques and structures that are capable of enhancing throughput in a wireless network link during block acknowledgement bursting operations.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
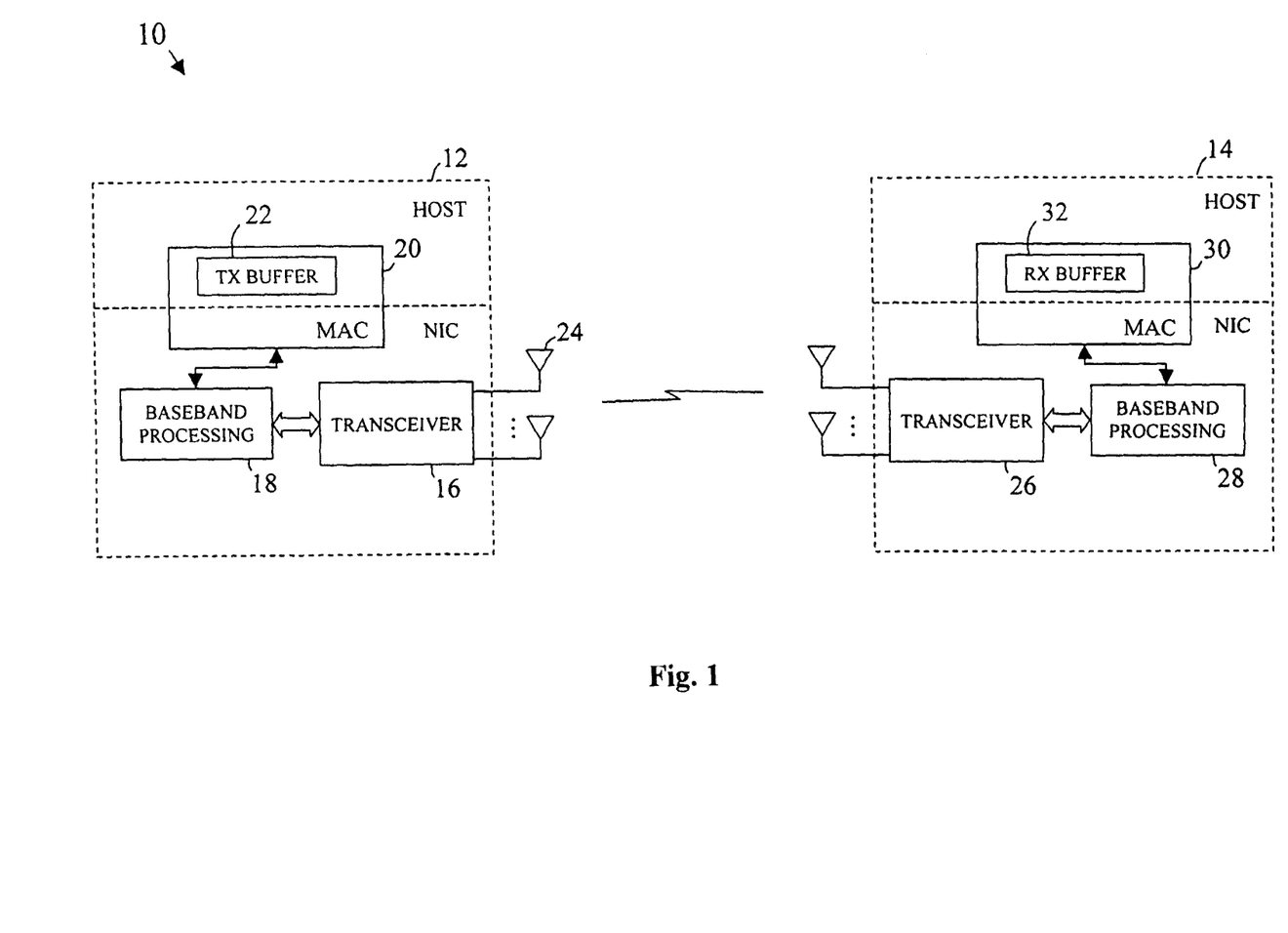
FIG. 1 is a block diagram illustrating an example wireless network arrangement that may utilize BA bursting techniques in accordance with an embodiment of the present invention.

FIG. 1 is a block diagram illustrating an example wireless network arrangement 10 that may utilize BA bursting techniques in accordance with an embodiment of the present invention. As illustrated, a first wireless network device 12 is communicating with a second wireless network device 14 via a wireless network link. The first and second wireless devices 12, 14 may be two wireless client devices operating in an ad hoc mode, one wireless client device and one wireless access point (AP) operating in an infrastructure mode, two wireless APs, or some other configuration of devices. When the first wireless device 12 wishes to transmit user data to the second wireless device 14 using block acknowledgement (BA) techniques, the first wireless device 12 initiates a BA transaction with the second wireless device 14. This will typically involve the use of a handshaking protocol between the two devices. The first wireless device 12 may be referred to as the "originator" of the BA transaction and the second wireless device 14 may be referred to as the "recipient." The BA transaction will typically be initiated during a transmission opportunity (TXOP) obtained by the originator. The BA transaction may include a number of BA windows (see, for example, BA windows 64, 66, 68, 70 of FIG. 4). Within each BA window, the originator may transmit a series of data frames (e.g., MAC protocol data units (MPDUs) or another type of data frames) followed by a BA request. The recipient may then respond to the BA request with a BA response. The various frames will typically be separated from one another by a short time period (e.g., a short interframe space (SIFS) in an IEEE 802.11 based network). The BA request will request an acknowledgement for each of the data frames transmitted to the recipient. The BA response will then indicate, for each identified data frame, whether the frame was successfully received or not.

As illustrated in FIG. 1, the first wireless device 12 may include: a wireless transceiver 16, a baseband processing subsystem 18, and a medium access control (MAC) subsystem 20. The wireless transceiver 16 is operative for supporting wireless communication with one or more remote wireless entities. The baseband processing subsystem 18 is operative for performing baseband processing of signals received by, and to be transmitted from, the wireless transceiver 16. The MAC subsystem 20 is responsible for control functions related to creating, transmitting, receiving and maintaining the integrity of frames according to the rules of a corresponding wireless standard, including the Block Acknowledgement rules. In the illustrated embodiment, the first wireless device 12 includes a host device having a network interface card (NIC) (or other network interface structure) installed therein. The baseband processing subsystem 18 and the wireless transceiver 16 are located within the NIC. The MAC subsystem 20 is divided between the host device and the NIC. It should be appreciated that many alternative arrangements may alternatively be used (e.g., all subsystems may be integrated within a host without a separable NIC, etc.).

As shown in FIG. 1, the MAC subsystem 20 may include a transmit buffer 22 for use during transmit operations when the first wireless device 12 is acting as, for example, the originator of a BA transaction. As will be discussed in greater detail, the transmit buffer 22 may be loaded with one or more BA frame sequences during a BA transaction which may then be delivered to the transceiver 16 for transmission into the wireless channel. In at least one embodiment, the transmit buffer 22 resides in the host memory. The MAC subsystem 20 may use a general purpose microprocessor, a reduced instruction set computer (RISC), a complex instruction set computer (CISC), a field programmable gate array (FPGA), an application specific integrated circuit (ASIC), and/or others. Other digital circuitry and/or logic may also, or alternatively, be present within the MAC subsystem 20. As used herein, the term "logic" may include software, hardware, and/or a combination of software and hardware.

The baseband processing subsystem 18 may include one or more programmable/reconfigurable digital processing devices such as, for example, a digital signal processor (DSP). As shown, the wireless transceiver 16 may be coupled to one or more antennas to facilitate the transmission and reception of wireless signals. Any type of antenna(s) may be used including, for example, a dipole, a patch, a helical antenna, and/or others.

The second wireless device 14 may also include a wireless transceiver 26, a baseband processing subsystem 28, and a MAC subsystem 30 which operate in a similar manner to those of the first wireless device 12. As shown, the MAC subsystem 30 of the second wireless device 14 may include a receive buffer 32 for use during receive operations when the second wireless device 14 is acting as, for example, the recipient device in a BA transaction. When the second wireless device 14 is receiving a series of data frames from the first wireless device 12 during a BA transaction, the data frames may be temporarily stored within the receive buffer 32. The data frames may be stored sequentially in the receive buffer 32 based on the sequence numbers of the frames. The data frames may thereafter be read out of the receive buffer 32 in sequential order, thus releasing corresponding storage locations within the buffer 32. If one or more of the data frames was not successfully received by the second wireless device 14, then the data within the corresponding storage location may not be read out. If the buffer thereafter fills up before the subject frame is retransmitted and successfully received, then no further data frames may be delivered to the recipient and the BA transaction stalls. This can seriously degrade throughput within the network. In one aspect of the present invention, techniques and structures are provided for efficiently managing operation during BA transactions to enhance throughput within the corresponding network link.

Figure 2:
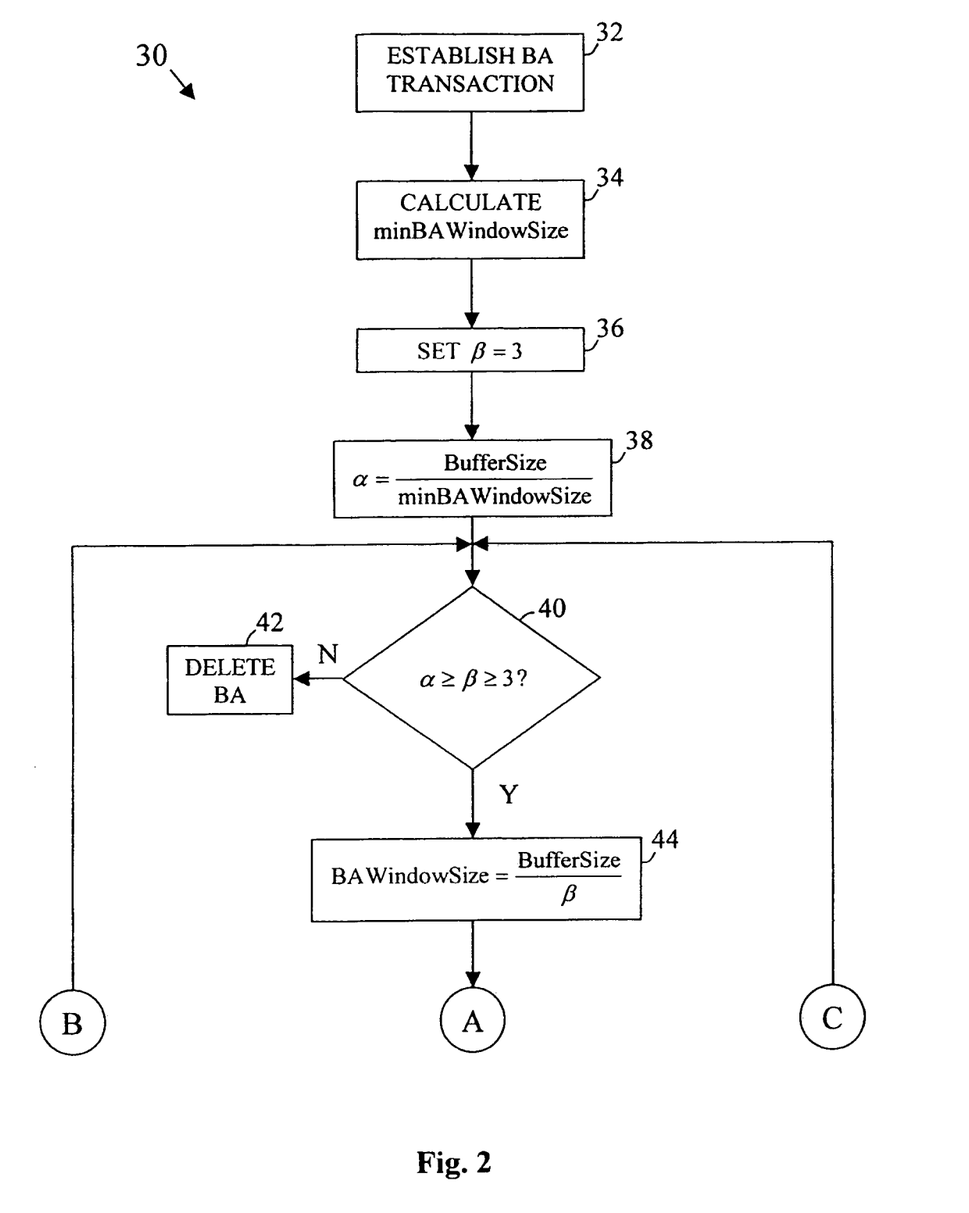
FIGS. 2 and 3 are portions of a flowchart illustrating an example method for use during a BA transaction in a wireless network in accordance with an embodiment of the present invention.
Figure 3:
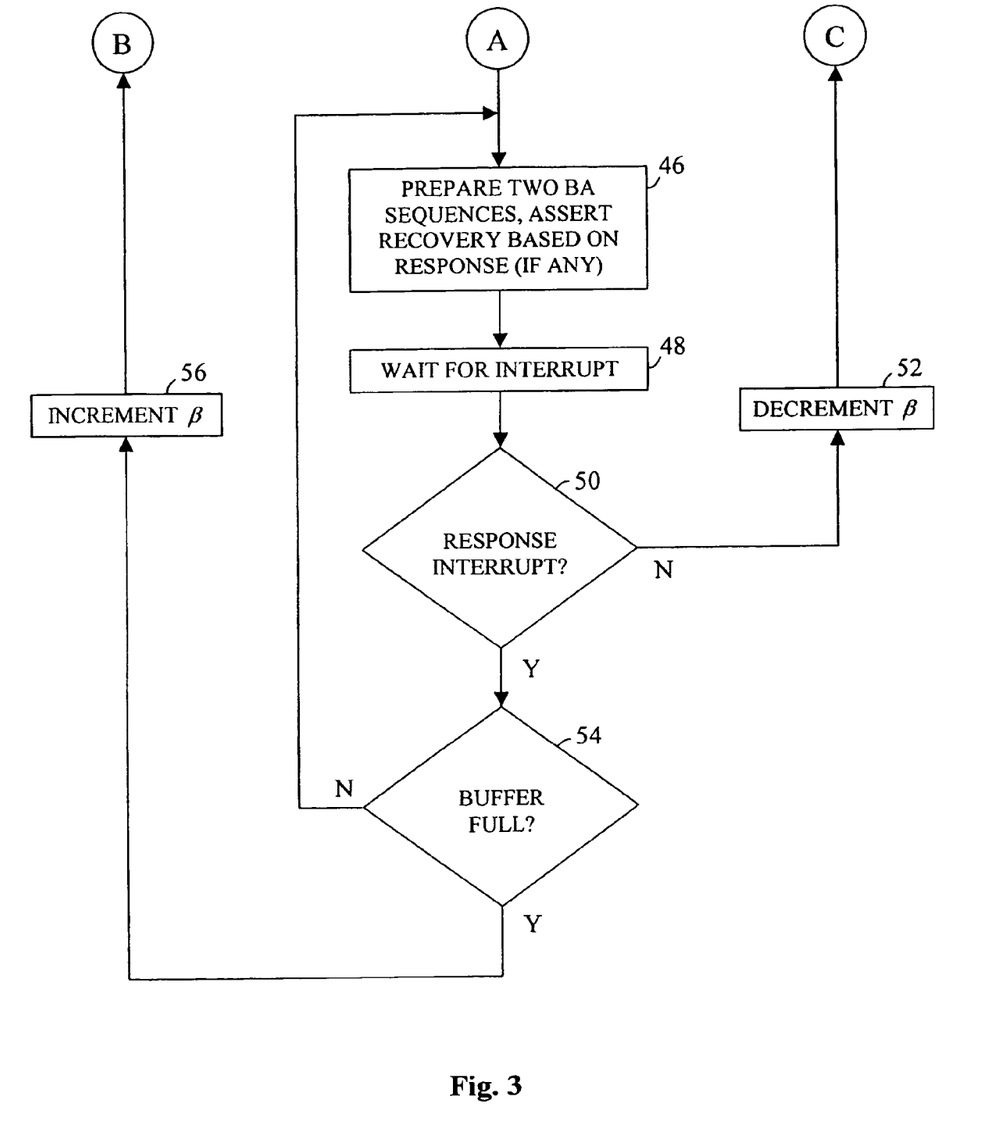

FIGS. 2 and 3 are portions of a flowchart illustrating an example method 30 for managing the performance of a BA transaction in accordance with an embodiment of the present invention. The method 30 may be implemented within, for example, the MAC subsystem 20 in the first wireless device 12 of FIG. 1 or in other locations/structures. A BA transaction is first established between an originator device and a recipient device (block 32). The BA transaction may be established by, for example, performing a predetermined handshaking procedure. During this handshake procedure, the parameters of the BA transaction may be agreed upon such as, for example, the recipient reordering buffer size (BufferSize) and/or others. A minimum BA window size to be used during the BA transaction is then calculated (block 34). In at least one embodiment, the minimum BA window size is calculated as follows:

$$MinBAWindowSize = \frac{ProcessingDelay \times Rate}{AverageFrameSize}$$

where ProcessingDelay is the delay of the originator in processing the BA response, Rate is the bit rate of the data transfer in the associated PHY, and AverageFrameSize is the average size of the data frames transmitted through the associated wireless link. Rate may be a parameter that is changed by the originator from time to time based on, for example, air link conditions. The value of Rate used in the above calculation should be the maximum rate allowed under the associated BA transaction. The value of AverageFrameSize may be derived in any of a number of different ways. In one approach, for example, the value may be obtained from the "Traffic Specification" submitted by the upper protocol layers. In another approach, the value may be estimated as the average size of data frames transmitted in a given time period before the current BA transaction was established. Other techniques for determining/estimating the average frame size may alternatively be used.

Next, a parameter β is initialized to a value of 3 (block 36). The parameter β is a divisor value that is used to determine the actual BA window size that will be used during the BA transaction. The initial value of 3 has been empirically derived for a particular implementation and may be different in other implementations. As will be described in greater detail, the value of β (and thus the BA window size) may vary during the BA transaction based on one or more occurrences during the transaction. A parameter α is also obtained at this point (block 38). The value of α may be calculated/estimated outside of the present method 30 in which case the value only needs to be retrieved for use in the method. Alternatively, the value may be calculated as part of the method 30. In at least one embodiment, the parameter α will be evaluated as follows:

$$\alpha = \frac{BufferSize}{MinBAWindowSize}$$

where BufferSize is the size of the receive buffer within the recipient device and MinBAWindowSize is the minimum BA window size, as described above. The size of the receive buffer within the recipient device may be determined by the originator during, for example, the initial handshake procedure.

With reference to FIG. 2, it is next determined whether the relationship α≥β≥3 is valid (block 40). If the relationship is not valid, it is concluded that the BA transaction cannot be maintained and the BA transaction is deleted (block 42). Thus, in the illustrated embodiment, if the value of α is less than 3 (i.e., the receive buffer is less than 3 times as large as the minimum BA window size), the BA transaction is deleted. The associated frames may thereafter be transmitted to the recipient in another manner (i.e., other than using the BA mechanism). If the relationship is valid, the actual BA window size is set to BufferSize/β (block 44).

Referring now to FIG. 3, after the initial BA window size has been determined, two BA sequences are prepared for transmission (block 46). The two BA sequences will be generated so that each one may be transmitted within the calculated BA window size. As this is still the beginning of the BA transaction, there are no data frame re-transmissions to be made at this point. However, in subsequent iterations, if a BA response from the recipient has indicated that data frame re-transmissions are needed, these would accounted for within the BA sequences. After the two sequences have been developed, the corresponding data frames and BA requests may be loaded into the transmit buffer of the originator for transmission. The method 30 may then wait for an interrupt to occur (block 48). When an interrupt is detected, it is next determined whether the interrupt is a response interrupt (block 50). The response interrupt is the interrupt that occurs when a BA response is received from the recipient. Another type of interrupt that may occur at this point is an interrupt that indicates that a data frame was not ready to be transmitted a SIFS time period after a previous frame. If the detected interrupt is not a response interrupt, it is concluded that the BA window has been broken. If this occurs, the value of parameter β will be decremented by 1 (block 52). The method 30 will then return to block 40 (FIG. 2) and reevaluate the validity of the relationship α≥β≥3 for the new value of β. If the relationship is still valid, a new BA window size will be determined (block 44) and the method 30 will continue. Because the value of β was reduced, the new BA window size will be larger than the previous BA window size. This gives the originator a longer time to prepare the next sequence, thus preventing the next window from being broken.

Referring back to block 50 in FIG. 3, if the detected interrupt is a response interrupt, it is next determined whether the receive buffer in the recipient is full (block 54). This information may be carried within the BA response itself. If the buffer is not full, the method 30 returns to block 46 and another two BA sequences are prepared at the same BA window size. This process will then repeat over and over again until the end of the BA transaction as long as no broken BA windows occur and the receive buffer remains less than full. During any iteration, if retransmissions need to be made, they will be factored into the BA sequences.

If the receive buffer is determined to be full in block 54, it is concluded that no further data may be transmitted to the recipient device. The value of parameter β is then incremented (block 56). The method 30 will then return to block 40 (FIG. 2) and the validity of the relationship α≥β≥3 will be reevaluated for the new value of β. If the relationship is still valid, a new BA window size will be determined (block 44) and the method 30 will continue. Because the value of β has increased, the new BA window size will be smaller than the previous BA window size. This smaller BA window size will make it less likely that the receive buffer will be filled in subsequent BA windows. The method 30 may then continue as described above until: (a) all desired data frames have been transferred, (b) the transmission opportunity (TXOP) terminates, or (c) the BA transaction is deleted (see block 42 in FIG. 2).

Figure 4:
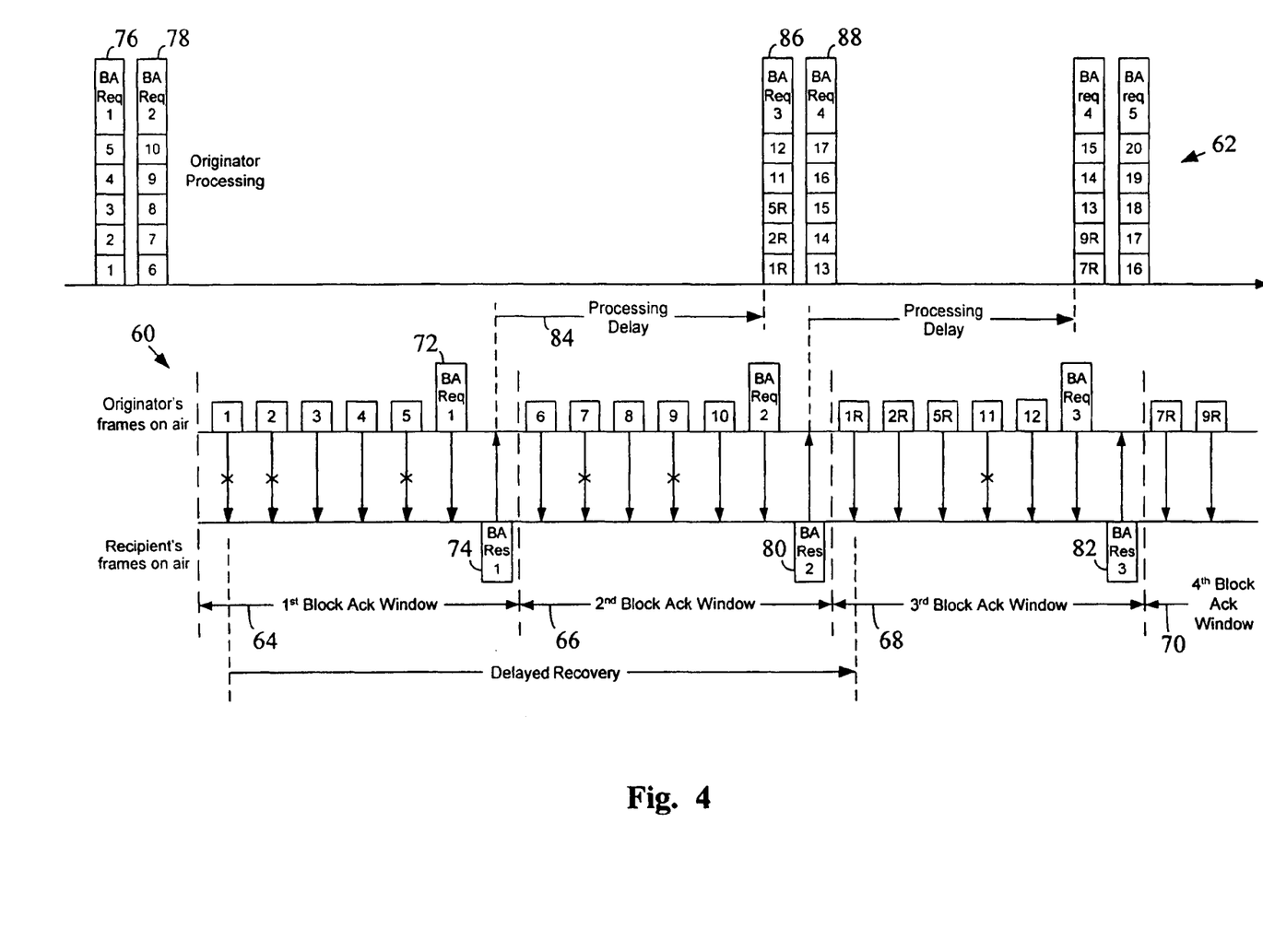
FIG. 4 is a timing diagram illustrating an example BA transaction and associated originator processing in accordance with an embodiment of the present invention.

FIG. 4 is a timing diagram illustrating a portion of an example BA transaction 60 and associated originator processing 62 in accordance with an embodiment of the present invention. As illustrated, the BA transaction 60 is divided into a number of consecutive BA windows 64, 66, 68, 70, etc. Within each BA window 64, 66, 68, 70, a series of data frames are transmitted followed by a BA request frame. For example, within a first BA window 64, data frames 1, 2, 3, 4, and 5 are transmitted followed by a first BA request 72 that requests an acknowledgement that data frames 1, 2, 3, 4, and 5 were successfully received. After the recipient receives the first BA request 72, it transmits a first BA response 74 back to the originator. The first BA response 74 identifies which of the data frames 1, 2, 3, 4, and 5 were successfully received from the originator and which were not. A similar sequence occurs within each of the subsequent BA windows 66, 68, 70, etc. A SIFS interval occurs between each successive frame in the various BA windows.

Before the first BA window 64 is initiated, the originator generates two BA sequences 76, 78 to represent the data frames and the associated BA request frames that are to be transmitted within the first two BA windows 64, 66. These two BA sequences 76, 78 may be stored within, for example, a transmit buffer within the originator for subsequent delivery into the wireless channel. In at least one embodiment of the invention, the frames within the developed sequences are transmitted into and received from the channel by memory mastering access (using buffers) without the help of corresponding host processors. Other techniques may alternatively be used (including techniques that use the host processors). Each BA response 74, 80, 82 within the BA transaction 60 will have a response interrupt associated with it that may be detected and used by the originator. In FIG. 4, an X is placed over the arrow associated with each data frame that was not successfully received by the recipient device. Thus, within the first BA window 64, data frames 1, 2, and 5 were not successfully received by the recipient, within the second BA window 66, data frames 7 and 9 were not successfully received by the recipient, and so on. This information will be contained within the corresponding BA response frames 74, 80, 82.

When the originator receives a BA response frame 74, 80, 82, the originator will not instantly know which of the associated data frames were not properly received during the corresponding BA window. That is, the originator will have to process the BA response frame to determine the acknowledgment information. The period of time it takes to perform this processing within the originator will be referred to herein as the originator processing delay. As illustrated FIG. 4, the originator has a processing delay 84 after the receipt of the first response frame 74 before the response information is known. A similar processing delay exists for each of the subsequent BA response frames. As discussed previously, in at least one embodiment of the present invention, the minimum BA window size is calculated as:

$$MinBAWindowSize = \frac{ProcessingDelay \times Rate}{AverageFrameSize}.$$

Using this minimum window size, the processing of a BA response frame will always be completed before the end of a subsequent BA window (assuming the parameters do not change). Thus, with reference to FIG. 4, the processing of BA response frame 74 of first BA window 64 is completed before the end of the second BA window 66, and so on. This allows the recovery for unsuccessfully received data frames identified within the BA response frame to occur within the second BA window after the end of the window carrying the BA response frame. For example, in FIG. 4, the first BA response frame 74 is received by the originator within the first BA window 64. After the processing delay 84, the originator knows that data frames 1, 2, and 5 were not successfully received by the recipient device. This processing occurs during the second BA window 66 in parallel with the transmission of data frames 6, 7, 8, 9, and 10. The originator then prepares two new BA sequences 86, 88 for transmission. As shown, the first new BA sequence 86 includes the three data frames (1, 2, and 5) that need to be retransmitted. These three data frames are subsequently transmitted as the first data frames of the third BA window 68. Once the three data frames have been successfully received and processed by the recipient device, the corresponding storage locations in the receive buffer can be released. A similar process may then be followed for each successive BA window in the BA transaction 60. The new BA sequences in the steady state may be prepared as a reaction to a response frame (interrupt).

As described previously, in at least one embodiment of the invention, the BA window length may adapt during the BA transaction. For example, if the receive buffer becomes full during a particular BA window, the BA window size may be decreased for subsequent BA windows to reduce the likelihood that the buffer will become full during those windows. The BA window size may not, however, be lowered below the minimum BA window size (MinBAWindowSize). In a similar fashion, if the BA burst becomes broken during a particular BA window due to a data frame not being ready for transmission after a corresponding time period (e.g., a SIFS), the BA window size may be increased to prevent this occurrence in the subsequent windows. If neither of these two conditions occur, the same BA window size may be used for the duration of the BA transaction.

The techniques and structures of the present invention may be implemented in any of a variety of different forms. For example, features of the invention may be embodied within: laptop, palmtop, desktop, tablet, and/or other computers having wireless networking capability; personal digital assistants (PDAs) and other portable devices having wireless networking capability; cellular telephones and other handheld wireless communicators; pagers; satellite communicators; wireless network interface cards (NICs) and other network interface structures; integrated circuits; as instructions and/or data structures stored on non-transitory machine readable storage media; and/or in other formats. Examples of different types of non-transitory machine readable storage media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
    initiating a block acknowledgement (BA) transaction between an originator device and a recipient device;
    calculating a minimum BA window size for said BA transaction based in part on a processing delay of said originator device, a data bit transfer rate in a channel from said originator device to said recipient device and an average size of data frames transmitted in said channel;
    calculating an actual BA window size to use during said BA transaction as a function of a receive buffer size associated with said recipient device, said receive buffer size being a multiple of said minimum BA window size for said BA transaction; and
    deleting the BA transaction when said receive buffer size associated with said recipient device is less than the minimum BA window size.

2. The method of claim 1, wherein:
    said minimum BA window size is calculated as:

$$MinBAWindowSize = \frac{ProcessingDelay \times Rate}{AverageFrameSize}$$

where ProcessingDelay is said processing delay of said originator device, Rate is a data bit transfer rate in a channel from said originator device to said recipient device, and AverageFrameSize is an average size of data frames transmitted in said channel.

3. The method of claim 1, wherein:
    calculating an actual BA window size includes calculating said actual BA window size as a fraction of said receive buffer size associated with said recipient device.

4. The method of claim 1, further comprising:
    preparing two BA sequences to transmit from said originator device to said recipient device after calculating said actual BA window size, each of said two BA sequences having a plurality of data frames and a BA request frame.

5. The method of claim 4, further comprising:
    decreasing said actual BA window size after preparing said two BA sequences when a response interrupt is received and a receive buffer of said recipient device is full.

6. The method of claim 4, further comprising:
    increasing said actual BA window size after preparing said two BA sequences when an interrupt is received that is not a response interrupt.

7. The method of claim 1, further comprising:
    transmitting a first BA sequence to said recipient device, said first BA sequence having a plurality of first data frames and a first BA request frame;
    receiving a BA response frame from said recipient device in response to said first BA request frame;
    processing said BA response frame to determine whether any of said first data frames were not successfully received by said recipient device; and
    preparing two new BA sequences for transmission to said recipient device that include said first data frames that were not successfully received by said recipient device, a plurality of new data frames, and a new BA request frame.

8. The method of claim 7, further comprising:
    transmitting a second BA sequence to said recipient device while said BA response frame is being processed.

9. The method of claim 1, further comprising:
terminating said BA transaction when said actual BA window size is reduced below said minimum BA window size during said BA transaction.

10. An apparatus comprising:
a wireless transceiver to support wireless communication with one or more remote wireless entities; and
a medium access control (MAC) subsystem, coupled to said wireless transceiver and comprising digital circuitry, to:
establish a block acknowledgement (BA) transaction with a remote device;
calculate a minimum BA window size for said BA transaction based in part on a processing delay of said apparatus, a data bit transfer rate in a channel from said apparatus to said remote device and an average size of data frames transmitted in said channel;
calculate an actual BA window size to use during said BA transaction as a function of a receive buffer size associated with said remote device, said receive buffer size being a multiple of said minimum BA window size for said BA transaction; and
deleting the BA transaction when said receive buffer size associated with said remote device is less than the minimum BA window size.

11. The apparatus of claim 10, wherein:
said MAC subsystem calculates said minimum BA window size as:

$$MinBAWindowSize = \frac{ProcessingDelay \times Rate}{AverageFrameSize}$$

where ProcessingDelay is said processing delay of said apparatus, Rate is a data bit transfer rate in a channel from said apparatus to said remote device, and AverageFrameSize is an average size of data frames transmitted in said channel.

12. The apparatus of claim 10, wherein:
said MAC subsystem calculates said actual BA window size as a fraction of said receive buffer size associated with said remote device.

13. The apparatus of claim 10, wherein:
said MAC subsystem includes logic to prepare two BA sequences to transmit to said remote device after calculating said actual BA window size, each of said two BA sequences having a plurality of data frames and a BA request frame.

14. The apparatus of claim 13, wherein:
said MAC subsystem includes logic to decrease said actual BA window size, after said two BA sequences have been prepared, when a response interrupt is detected and a receive buffer of said remote device is full.

15. The apparatus of claim 13, wherein:
said MAC subsystem includes logic to increase said actual BA window size, after said two BA sequences have been prepared, when an interrupt is detected that is not a response interrupt.

16. The apparatus of claim 10, wherein:
said MAC subsystem includes logic to (a) transmit a first BA sequence to said recipient device, said first BA sequence having a plurality of first data frames and a first BA request frame, (b) receive a BA response frame from said recipient device in response to said first BA request frame; (c) process said BA response frame to determine whether any of said first data frames were not successfully received by said recipient device; and (d) prepare two new BA sequences for transmission to said recipient device that include said first frames that were not successfully received by said recipient device, a plurality of new data frames, and a new BA request frame.

17. The apparatus of claim 16, wherein:
said MAC subsystem includes logic to cause a second BA sequence to be transmitted to said recipient device while said processing of said BA response frame is proceeding.

18. The apparatus of claim 10, wherein:
said MAC subsystem includes logic to terminate said BA transaction when said actual BA window size is reduced below said minimum BA window size during said BA transaction.

19. A system comprising:
at least one dipole antenna;
a wireless transceiver, coupled to said at least one dipole antenna, to support wireless communication with one or more remote wireless entities; and
a MAC subsystem, coupled to said wireless transceiver and comprising digital circuitry, to:
establish a block acknowledgement (BA) transaction with a remote device,
calculate a minimum BA window size for said BA transaction based in part on a processing delay of said system, a data bit transfer rate in a channel from said system to said remote device and an average size of data frames transmitted in said channel;
calculate an actual BA window size to use during said BA transaction as a function of a receive buffer size associated with said remote device, said receive buffer size being a multiple of said minimum BA window size for said BA transaction; and
deleting the BA transaction when said receive buffer size associated with said remote device is less than the minimum BA window size.

20. The system of claim 19, wherein:
said MAC subsystem calculates said minimum BA window size as:

$$MinBAWindowSize = \frac{ProcessingDelay \times Rate}{AverageFrameSize}$$

where ProcessingDelay is said processing delay of said system, Rate is a data bit transfer rate in a channel from said system to said remote device, and AverageFrameSize is an average size of data frames transmitted in said channel.

21. The system of claim 19, wherein:
said MAC subsystem calculates said actual BA window size as a fraction of said receive buffer size associated with said remote device.

22. The system of claim 19, wherein:
said MAC subsystem includes logic to prepare two BA sequences to transmit to said remote device after calculating said actual BA window size, each of said two BA sequences having a plurality of data frames and a BA request frame.

23. An article comprising a non-transitory storage medium having instructions stored thereon that, when executed by a computing platform, operate to:
establish a block acknowledgement (BA) transaction with a remote device;
calculate a minimum BA window size for said BA transaction based on an originator processing delay, a data bit transfer rate in a channel from an originator device to said remote device and an average size of data frames transmitted in said channel;

calculate an actual BA window size to use during said BA transaction as a function of a receive buffer size associated with said remote device, said receive buffer size being a multiple of said minimum BA window size for said BA transaction; and deleting the BA transaction when said receive buffer size associated with said remote device is less than the minimum BA window size.

24. The article of claim 23, wherein:
said minimum BA window size is calculated as:

$$MinBAWindowSize = \frac{ProcessingDelay \times Rate}{AverageFrameSize}$$

where ProcessingDelay is said originator processing delay, Rate is a data bit transfer rate in a channel from said originator deice to said remote device, and AverageFrameSize is an average size of data frames transmitted in said channel.

25. The article of claim 23, wherein:
said actual BA window size is calculated as a fraction of said receive buffer size associated with said remote device.

26. The article of claim 23, wherein said instructions further operate to:
prepare two BA sequences to transmit to said remote device after calculating said actual BA window size, each of said two BA sequences having a plurality of data frames and a BA request frame.

27. The article of claim 26, wherein said instructions further operate to:
decrease said actual BA window size after preparing said two BA sequences when a response interrupt is received and a receive buffer of said recipient device is full.

28. The article of claim 26, wherein said instructions further operate to:
increase said actual BA window size after preparing said two BA sequences when an interrupt is received that is not a response interrupt.

29. The article of claim 23, wherein said instructions further operate to:
transmit a first BA sequence to said remote device, said first BA sequence having a plurality of first data frames and a first BA request frame;
receive a BA response frame from said remote device in response to said first BA request frame;
process said BA response frame to determine whether any of said first data frames were not successfully received by said remote device; and
when at least one of said first data frames was not successfully received by said remote device, preparing two new BA sequences for transmission to said remote device that include said at least one first data frame.

* * * * *